J. A. WHERRY.

TYPEWRITER.

APPLICATION FILED APR. 15, 1921.

Reissued July 25, 1922.

15,426.

5 SHEETS--SHEET 1.

Inventor

John Ashland Wherry by B. C. Stickney

Attorney

J. A. WHERRY.
TYPEWRITER.
APPLICATION FILED APR. 15, 1921.
Reissued July 25, 1922. 15,426.
5 SHEETS—SHEET 2.
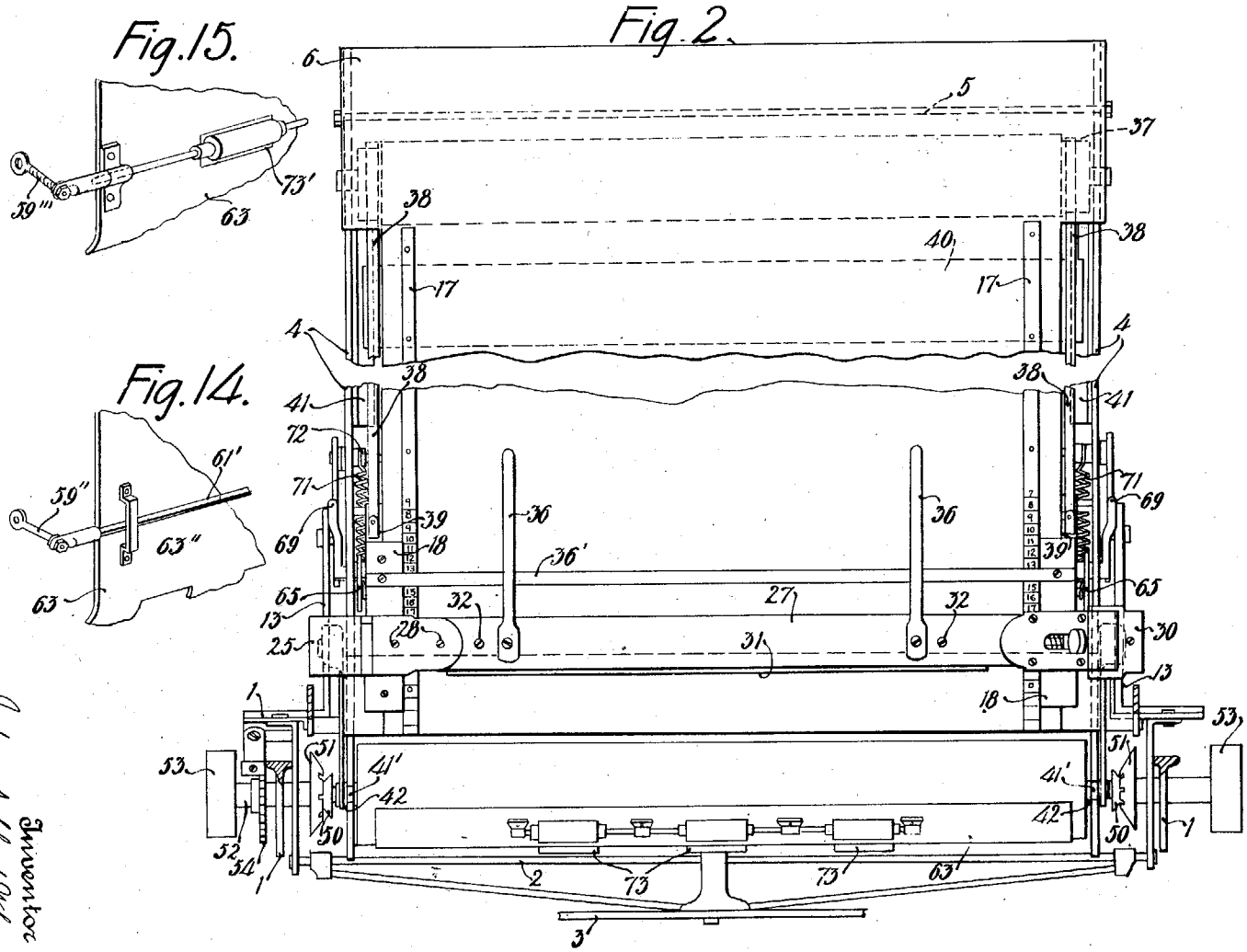
Inventor
John Ashland Wherry
by B. B. Stickney
Attorney J. A. WHERRY.
TYPEWRITER.
APPLICATION FILED APR. 15, 1921.
Reissued July 25, 1922.
15,426.
5 SHEETS—SHEET 3.
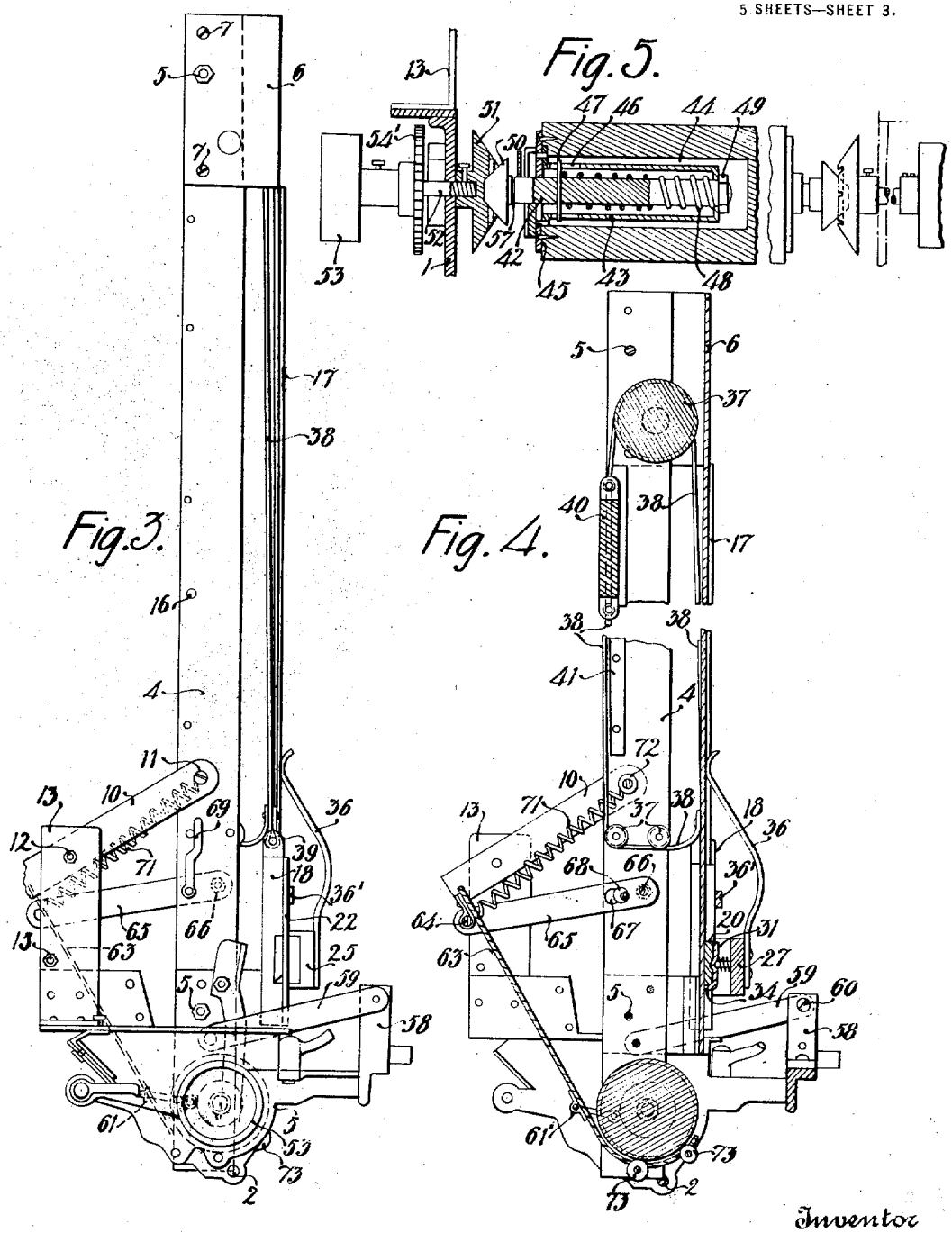
Inventor
John Ashland Wherry
by B. B. Stickney
Attorney J. A. WHERRY.
TYPEWRITER.
APPLICATION FILED APR. 15, 1921.
Reissued July 25, 1922. 15,426.
5 SHEETS—SHEET 4.
Fig. 7.
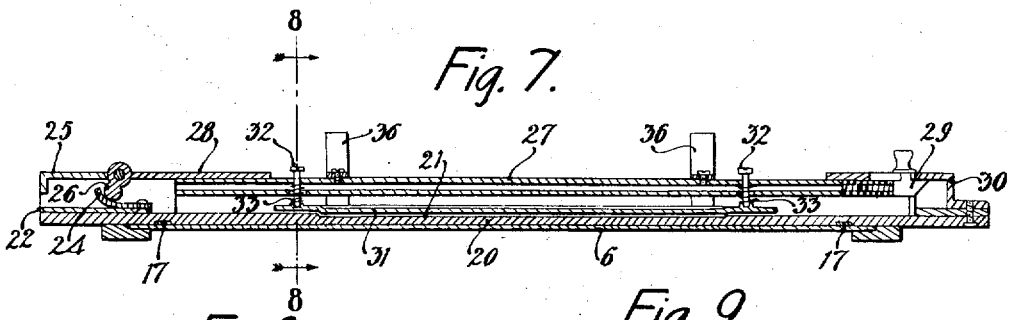
Fig. 8.
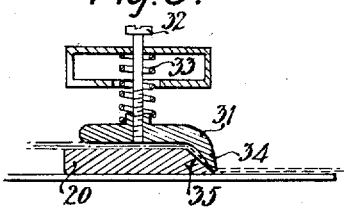
Fig. 9.
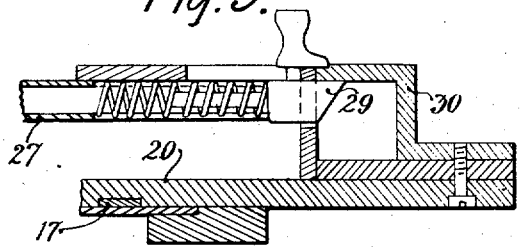
Fig. 10
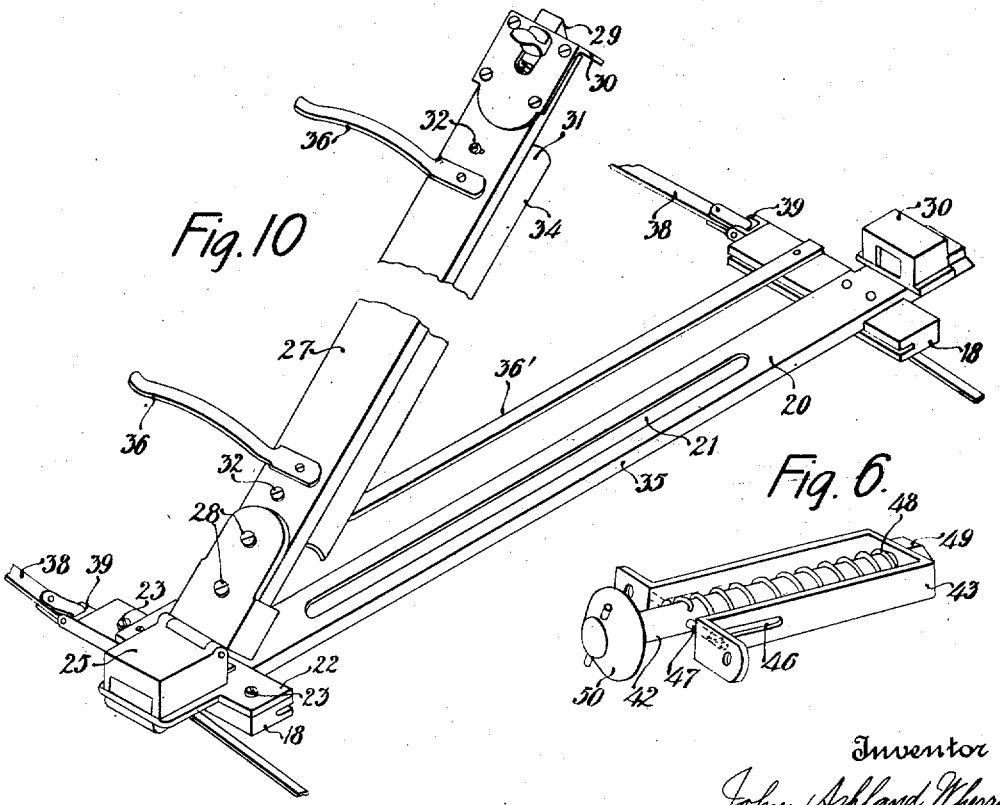
Fig. 6.
Inventor
John Ashland Wherry
by B. B. Stickney
Attorney J. A. WHERRY.
TYPEWRITER.
APPLICATION FILED APR. 15, 1921.
Reissued July 25, 1922.
15,426.
5 SHEETS—SHEET 5.
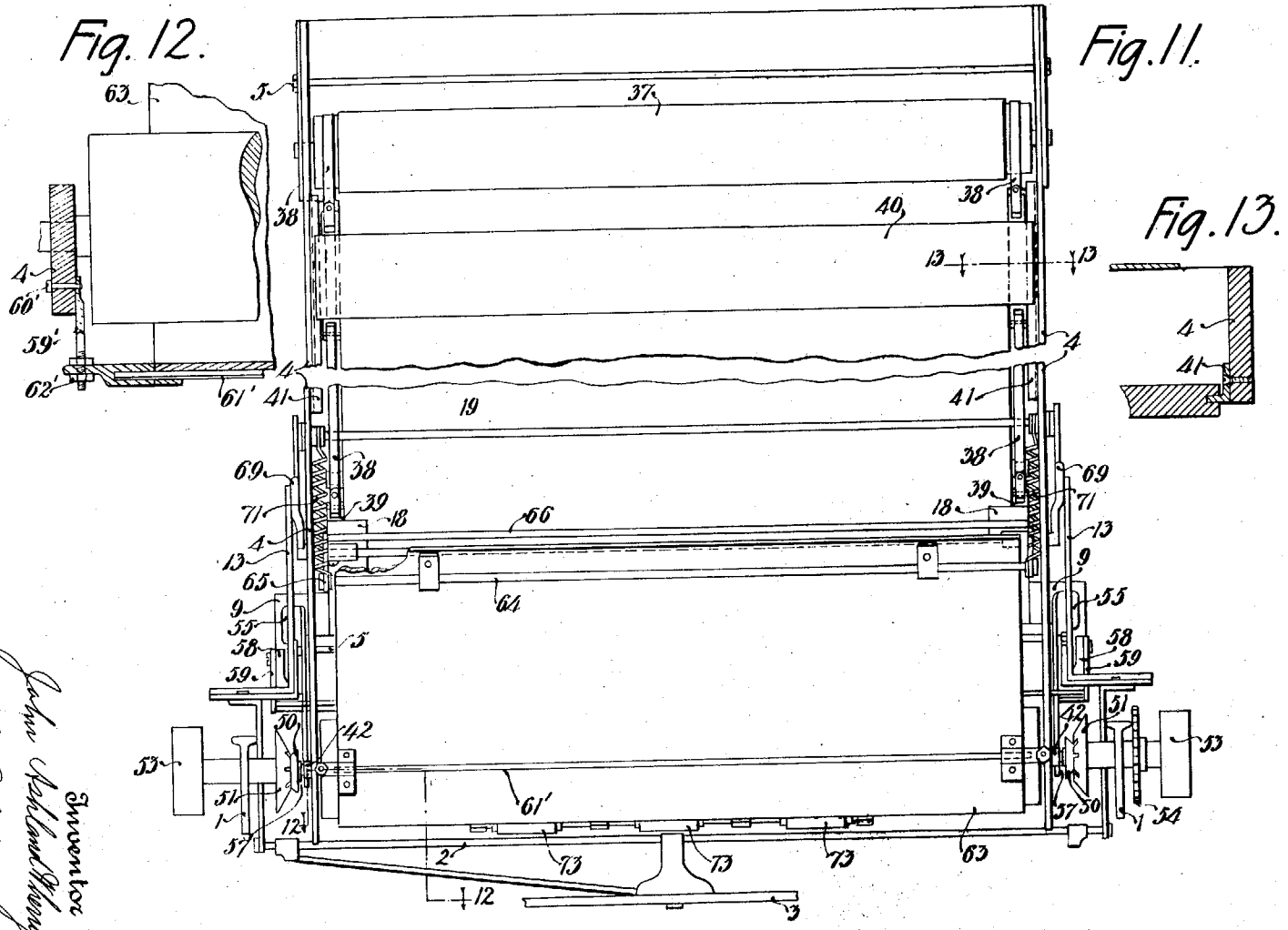
Inventor
John Ashland Wherry
by D. C. Stickney
Attorney

UNITED STATES PATENT OFFICE.

JOHN ASHLAND WHERRY, OF NEW ORLEANS, LOUISIANA, ASSIGNOR TO UNDERWOOD TYPEWRITER COMPANY, OF NEW YORK, N. Y., A CORPORATION OF DELAWARE.

TYPEWRITER.

15,426. Specification of Reissued Letters Patent. Reissued July 25, 1922.

Original No. 1,351,081, dated August 31, 1920, Serial No. 258,146, filed October 15, 1918. Application for reissue filed April 15, 1921. Serial No. 461,657.

*To all whom it may concern:*

Be it known that I, JOHN ASHLAND WHERRY, a citizen of the United States, residing at New Orleans, in the parish of Orleans, in the State of Louisiana, have invented certain new and useful Improvements in Typewriters; and I do hereby declare the following to be a full, clear, and exact description of the invention, such as will enable others skilled in the art to which it appertains to make and use the same.

The present invention relates to typewriting machines, in which a rotary platen occupies a printing position just in rear of a type-guide and a ribbon-vibrator, which render it difficult to insert sheets downwardly in front of the platen, and to collate them on the platen. According to the present invention, the platen and a collating table are displaceable from normal or typing position forwardly over said printing instrumentalities to a position where interference from the type-guide and ribbon is avoided, and where other functions, such, for instance, as sheet-collating, inserting and arranging, may hence be more conveniently effected; the platen being presented conveniently or accessibly to the operator for introducing the sheets bottom-end first around the platen at the collating operation, without liability of fouling upon the type-guide and ribbon-vibrator.

In its preferred form, the invention includes a table or board on which work-sheets may be collated or arranged, and which is mounted to be displaced with the platen from normal or typing position to a position in which the sheet-collating or arranging is effected.

In a front-strike machine, such, for instance, as the Underwood, there is usually provided an apron or paper-guide which passes around the lower part of the platen $17^a$ to the front thereof, where it forms, with the platen, a mouth through which the typewritten sheets are ejected, top-end foremost. Certain parts of the printing mechanism, as, for instance, the ribbon, ribbon-guide and type-guide, are positioned in front of the platen, above the forward end of the apron or paper-guide. A feature of the present invention is the provision of means whereby, in such a machine, the platen may be translated, with the printing face foremost or in the line of vision, together with the apron or paper-guide, over and clear of the printing mechanism to a station or position where the sheets may conveniently be inserted bottom-end first into the mouth defined by the platen and the apron at the front of the platen, and thence be guided by the apron onto the face of the platen to such position thereon as may be desired for commencement of the writing.

More particularly, where a collating table is employed, the invention provides means for translating the platen and the apron over and clear of the printing mechanism to a position where the sheets may be assembled on the table with their bottom-ends in, or in line with, the mouth formed by the apron and the platen; and thereafter be guided, bottom-end first, from the table to the platen by means of the apron.

A feature of the invention, in the preferred form thereof, is the provision of means (such, for instance, as the usual releasable feed-rolls), whereby a sheet, which has been guided bottom-end first to a given line position on the platen, may be clamped in such position to the platen, at the sheet-inserting station, preparatory to the return of the platen to the printing station; and whereby a collation of sheets may similarly be clamped to the platen at the collating station, and thus held against any disarrangement.

A feature of the invention is the provision for a bodily floating movement of the platen, and associated parts, forwardly from the normal to the sheet-arranging position (as distinguished, for instance, from a mere angular swing of these parts), whereby the platen in collating position may present the proper side thereof to the operator, and whereby ease of action may be obtained by distributing and balancing the weight of the parts, and by suitably arranging the several points of support, and constructing the supporting connections. By relatively compact mechanism, the parts may be brought to the most desirable position, and automatically into correct angular setting, for sheet-collating or arranging.

In effecting the floating movement of the present invention, in the preferred embodiment thereof hereinafter described, the platen is set in a bearing-piece, frame or mount, in which it has its normal line-feed rotation, and this frame may also carry a collating table The frame forms a member of a linkage, being connected to the typewriter-carriage by a plurality of links or sets of links, which are pivoted to the carriage. The different sets of links or arms move on different axes on the typewriter carriage, and are pivotally connected to the frame at separated points. As one part of the frame follows the angular swing of one set of arms, the other set of arms supports the frame at another part thereof and causes the frame to be rocked with respect to the first set of arms, so that a combined bodily and floating action is obtained, which may be made to result automatically, or without further adjustment, in appropriate angular settings for the parts with respect to the line of vision when said parts come to rest in sheet-arranging position at the end of their forward throw.

Another feature of the invention is the provision of means whereby the several sheets of work may be assembled and conducted to the printing position of the platen without disarrangement and without being provided with any alining devices.

It is a feature of the invention to present the platen in the sheet-arranging position in such a manner that the collated or arranged sheets may there be clamped to the platen, as by means of feed-rolls, and, as so arranged and clamped, may be carried with the platen back to the normal or typing position of the latter. In this connection, the invention may provide not only for a collating board movable with the platen in fixed relation thereto, between normal and collating positions, but also for movement in fixed relation with the platen, between these positions, of a paper-shelf or other feed-roller support.

A further feature of the invention resides in so constructing the device that it may be attached to typewriters of various forms now in commercial use, with the minimum alteration of the typewriter constructions.

In the accompanying drawings,

Figure 1 is a perspective view of the invention, showing the same attached to a typewriter, only a portion of the latter, however, being shown.

Figure 1ª is a diagram to show the platen floated forward over the type-guide and ribbon-vibrator to full-line collating position; the printing point on the platen being indicated by the arrow.

Figure 2 is a front elevation of the device and of so much of the typewriter as is shown in Figure 1.

Figure 3 is a side elevation showing the device in the printing position.

Figure 4 is a vertical sectional view with the parts occupying the positions they occupy in Figure 3.

Figure 5 is an enlarged sectional view showing the manner in which the platen is clamped to the platen turning mechanism.

Figure 6 is a perspective view of one clutch member which is carried by the platen.

Figure 7 is a longitudinal sectional view of the sheet clamping means.

Figure 8 is an enlarged sectional view of the sheet clamping means.

Figure 9 is a sectional view showing the manner in which the sheet clamping means is locked.

Figure 10 is a perspective view of the sheet clamping means.

Figure 11 is a rear elevation of the entire device.

Figure 12 is a detail of the sheet shelf supporting device.

Figure 13 is a fragmental detail section on the line 13—13 of Figure 11, and

Figures 14 and 15 are fragmental views of modified forms of sheet guiding devices.

Figures 1, 1A:
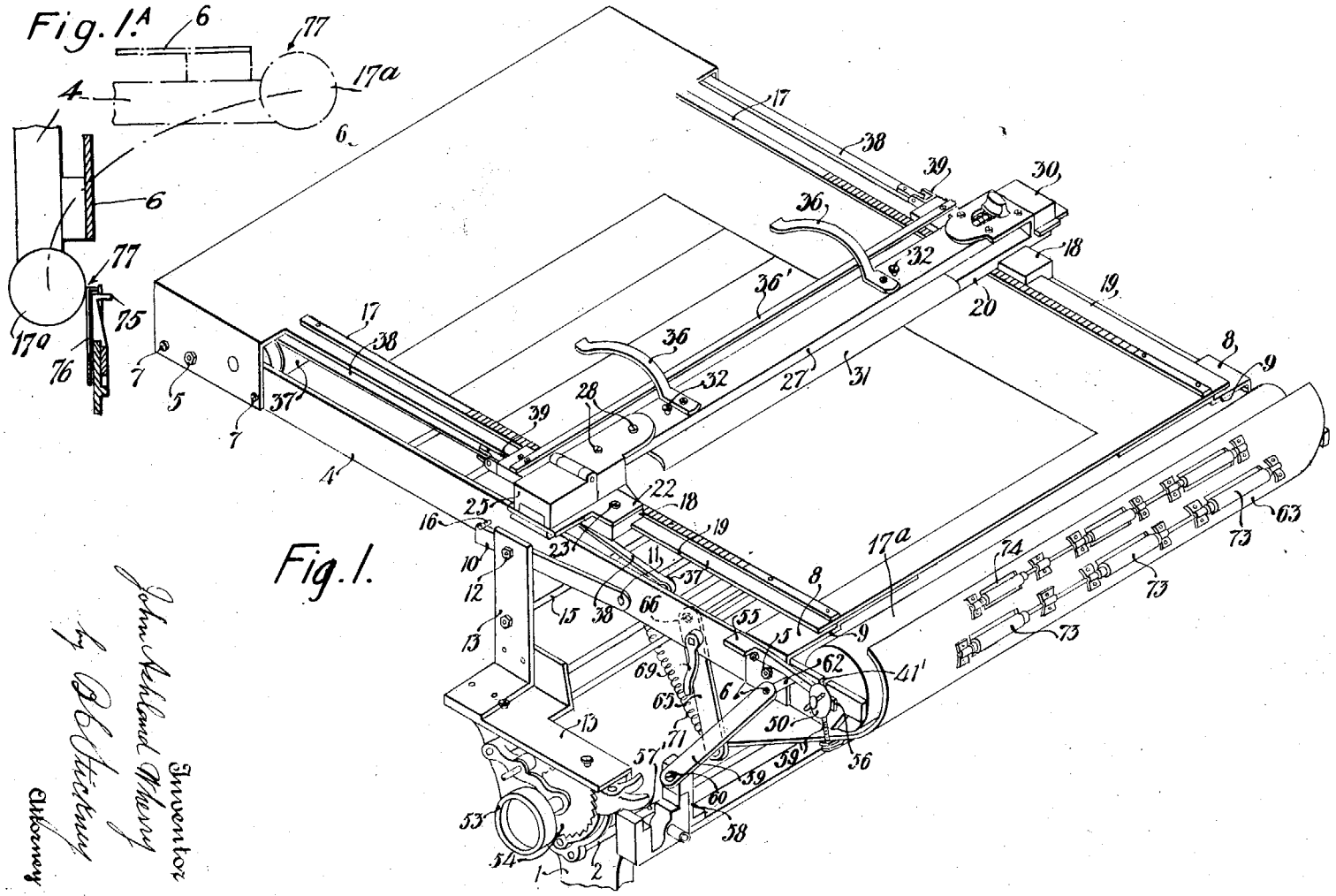

In the drawings I have illustrated a portion of a typewriter which includes a frame 1, the feed-roller rod 2 and the shift rod 3.

The frame of the collating device comprises side bars 4, which are secured together at their ends by transverse rods 5. The collating board 6 is secured to this frame at one end by screws 7 and at the other end by brackets 8, which extend transversely of the board and beneath the same, the ends of the brackets being depressed, as shown at 9, so as to afford a free passage for the slides of the sheet clamping means, as will appear. Fast to the typewriter-carriage, on either end thereof, are brackets 13, and pivoted on an axis, indicated at 12, to the brackets 13, are links or arms 10, which are pivotally connected at their other ends at 11 to the side bars 4 of the frame which carries the collating board and platen, so that this frame and associated parts may swing on the axis 11 with respect to the carriage, so as to obtain the desired movement. Moreover, a certain part of the weight of the frame may thus be received at the axis 11 and carried by the brackets 13 at the rear of the typewriter-carriage. The brackets 13 may be braced by a transverse rod 15 which extends beneath the collating board. The free end of each of the links 10 projects beyond the pivot point 12 and is adapted to engage a pin 16 extending from the adjacent side bar 4, so as to maintain the collating board in substantially a horizontal position. At the edges of the collating board, but slightly spaced therefrom, are scales 17 by means of which the positions of the several sheets to be collated are determined, as will be readily understood.

It will be seen that the several sheets of paper, with the carbons interposed between them, may be placed upon the surface of the collating board 6, with the edges abutting the scale 17 and thus properly arranged to subsequently be fed to the platen 17[a] in printing position.

In order that these sheets may be held in the proper relation to each other on the collating board, I have provided a sheet-clamping device which includes a pair of slides 18. These slides are mounted and operate upon the side edges 19 of the collating board, as clearly shown in Figure 1. A bar 20 extends between and is secured to these slides 18, the intermediate portion of the bar being provided with a depression 21 for a purpose which will later be described. A plate 22 is secured to one of the slides 18 by suitable fasteners 23, and this plate is provided with an upwardly-extending leaf spring 24. A hinge member 25 is mounted on the plate 22, and one of the leaves of the hinge is provided with a projection 26, against which the spring 24 bears to normally hold the hinge in such position that the upper clamping bar 27, which is secured to the hinge at 28, is held parallel to the lower clamping bar 20. On the end of the upper bar 27, opposite to the hinge end, a spring-pressed tongue 29 is mounted, the tongue being arranged to co-operate with a socket 30 to form a latch to hold the clamping bar 27 in position. A sheet engaging bar 31 is located between the clamping bars 20 and 27 and is yieldingly mounted on the upper bar 27 by means of guide screws 32 and coil springs 33. This sheet engaging bar 31 is formed to fit in the depression 21 in the lower bar 20 and is provided with a bill 34 which overhangs the beveled edge 35 of the lower bar. The sheets of work pass over the lower bar 20 and are clamped against the same by the resilient pressure through the sheet engaging bar 31, so that all possibility of relative movement of the sheets which are being collated is obviated. In order to prevent the upper portions of the sheets from falling away from the collating board 6 when the latter is swung to its vertical position, a pair of resilient fingers 36 is secured to the upper bar 27 and extends over the collating board, as illustrated clearly in Figure 1. A bar 36′ extends from one slide 18 to the other and is located beneath the fingers 36. This bar 36′ assists in maintaining the sheets of work in position since the sheets are inserted beneath it.

Located beneath the collating board 6 and mounted in the side bars 4 of the frame, are rollers 37 and 37′, around which endless belts 38 pass. These belts are secured to clamps 39 on the slides 18 and have counterweights 40 interposed therein. These counterweights 40 operate on guides 41, which are mounted on the inner sides of the side bars 4 of the frame. Thus when the sheet clamp is moved in either direction, the weights will be likewise moved.

The side bars 4 of the frame are provided at the ends, opposite to the ends between which the roller 37 is mounted, with sockets 41′ in which spindles 42 projecting from the ends of the platen are supported. The platen is thus supported by the side bars 4. These spindles 42 are mounted within yokes 43, which extend into chambers 44 in the ends of the platen and are secured in place by plates 45. These yokes are provided with slots 46 through which slide pins 47 project, the pins being extended through the spindles 42 to limit the sliding movement of the spindles longitudinally within the yokes 43. The spindles are normally pressed outwardly by coil springs 48 and are provided on their ends with abutment nuts 49. The pins 47 in the slots 46 limit the movement of the spindles. The ends of the spindles 42 are provided with clutch members 50, which co-operate with complemental clutch members 51. These clutch members 51 are mounted on the trunnions 52 of the platen rotating mechanism, which mechanism includes the usual hand knobs 53 and also the ratchet mechanism 54. These complemental clutch members 51 are attached to the platen rotating mechanism of a present commercial typewriter (the Underwood) with very slight modification of the mechanism, as will be obvious from an observation of Figure 5 of the drawings. The springs 48 maintain the clutch members 50 and 51 in engagement with each other when the platen is in its printing position, but the springs 48 are held under compression and the clutch members 50 are retracted, during the swinging of the platen, either to or from its printing position, by controlling levers 55, which are mounted on the side bars 4, and the ends 56 of which project into grooves 57 in the spindles 42, as will be seen in Figures 1 and 5 of the drawings.

With the collating board mounted pivotally on the brackets 13 which are supported on the frame 1 on the typewriting machine, it will be seen that the board may be swung either into substantially horizontal position or substantially vertical position, and when the board is moved from its horizontal position, in which position the sheets are placed upon the board, to its vertical position, the platen is swung into its printing position and the co-operating clutch members 50 and 51 are operated to engage so that the platen rotating mechanism may be effective to engage the platen. The ends of the side bars 4 at this time engage in notches 57′ which are formed in the rod 2. The engagement of the bars 4 in these notches prevents the frame from having any lateral movement when the frame is disposed vertically.

The frame which carries the platen-collating board is not, however, entirely supported and controlled in its movement by the links 10, which work on the axis 12 on the carriage and the axis 11 on the frame. The frame, forward of the axis 11, is carried by another link or set of links which connect with the forward part of the typewriter-carriage. These links, shown as 59, are pivotally connected at an axis 60 to lugs 58 on the front cross-piece of the typewriter-carriage, and, at their other ends, are pivotally connected at an axis 61 to swing on a rod 62, carried by the side pieces 4 of the frame in the proximity of the platen. When the collating board is bodily translated or floated on the system of links from its horizontal to its vertical position, the links 59 assume a position such as illustrated in Figures 3 and 4 of the drawings and support the lower end of the board.

Threaded bolts 59′, which are secured at 60′ to the side bars 4 of the frame, support at their lower ends a rod 61′, which rod may be adjusted vertically by means of nuts 62′ on the bolts. This rod 61′ is secured to and supports a sheet-shelf and guide 63, which is curved to conform to the curvature of the platen and which is extended and has attached thereto at 64 links 65. These links 65 are pivoted at the ends opposite to the attaching means 64 at 66 to the side bars 4 of the collating frame. Openings are formed in the links 65, and extending through these openings are cams 68, which are provided with operating handles 69 and which move in slots 67 in the links 65 during the movement of the sheet-shelf to and from the platen. When the cams 68 are turned so that the long diameters thereof extend at right angles to the short diameters of the slots 67, the sheet-support will be locked in position away from the platen. Springs 71, which are attached at 72 to the side bars 4, and at 64 to the links 65, by drawing upon the links 65 tend to swing the same upward around the pivot 66 to lift and maintain the sheet-support in normal position, so that the guide rollers 73, which are mounted on the outside surface of the support and extend through openings 74 in the same, will be held in contact with the platen, and consequently properly guide the paper during its feeding to printing position. The slots 67 allow for the swing of the links 65 under the action of the cams 68.

In Figure 14 a modified form of this portion of the device is shown. In this form the bolts 59″, which correspond to the bolts 59′ in the previously described form, are attached to the rod 61′ and are rigidly secured to the side bars 4. The rod 61′ extends along the outer surface of the guide 63 and through keepers 63″ which permit the guide 63 to move relatively to the rod 61′ during the throw of the sheet-shelf to apply and release the feed-rolls.

In the third form disclosed in Figure 15, the bolts 59‴ are pivoted to the side bars of the frame and are attached to the rod 61′. The rod in this case carries the rollers 73′. Therefore, when this form is used the rollers 73 of the first described form will be dispensed with.

As above noted, the paper-shelf or guide is carried by the collating-board frame when the latter moves between Figure 1 and Figure 4 positions, (or between the dotted-line and full-line positions at Figure 1[a]), and the feed-rollers 73 are carried with the paper-shelf from one position to the other, and the position of the platen, with respect to the collating board and feed-rollers and paper-shelf, is maintained in all positions of the collating-board frame. This enables the platen and the feed-rollers to be used as a means for clipping or securing the lower portions of the sheets when the same have been collated, that is, for maintaining the sheets in position against the platen during the return movement of the parts to normal position. During the collating of the sheets the rolls are cast off. It is merely necessary to throw off the feed-rolls and to move the bar 27 forward, so that the bottom ends of the sheets may pass down between the feed-rolls and the platen. The feed-rolls are then thrown back onto the platen, and, in this relation, all parts are moved backward to normal or typing position. There being no relative movement between the platen and the collating board, there is no pull or crumpling of the sheets.

Of course, it will be understood that after the sheets are clamped in place on the collating board, and the board has been returned to normal or typing position, the sheets may be fed to the printing position by feeding the sheets between the sheet-support 63 and the platen from the front to the rear of the latter. As the printing is subsequently done, the sheets will be fed in the reverse direction, as will be obvious.

While the operation of the device is though to be obvious from the preceding description, a brief résumé is here given. The collating board 6 is in its horizontal position when the work is applied thereto. The sheets which are to be collated are placed upon the board 6, being located under the bar 36′ and over the lower clamping member 20, the upper member 27 having been swung into the position shown in Figure 10, that is to say, away from the member 20. The sheets are properly assembled in this position by means of the scales 17, and the upper clamping member 27 swung into position to hold the sheets in place. With the feed-rolls released, the slide 20 may be moved forward to introduce the ends of the sheets between the feed-rolls and the platen, and the feed-rolls then thrown back to the platen to hold the ends of the sheets in place. The collating board is then swung into its vertical position, concomitantly with the swinging of the platen 17ª at Figure 1ª back from its dotted-line collating position to its full-line printing position, at which time the sheets of work will be supported by the bar 36′ and the fingers 36. The clutch members 50 and 51 will move into alinement with each other and when the controlling levers are operated to release them, they will automatically be engaged by the springs 48. The platen will at this time be in printing position, and the frame will be held against lateral movement by the engagement of the side bars 4 in the notches 57′. With the frame in its vertical position, the sheets of work are fed between the platen and guide 63 until the top line to be printed is in proper position. The work-sheets are then released from the clamping device 27. Thereafter the sheets will be moved in the reverse or line-feed direction in the usual manner.

It will be noted, upon reference to Figures 4 and 1, that, in the movement of the parts from normal to sheet-arranging positions, the lower end of the frame is carried upward and forward on the links 59, which serve as a partial support or guide for the frame, and that, in so far as the frame is supported or guided by the links 59, it is supported from the front part of the typewriter-carriage. During this movement, the frame, at a point intermediate thereof, is held or guided by the links 10 in such manner as to cause the frame to be folded down and to be supported by the links 10 from the brackets 13 at the rear of the typewriter-frame. The frame is thus bodily floated from two axes on the typewriter-carriage and two axes on the frame itself in its movement between the normal and collating positions. The frame may thus preferably be balanced to a certain degree, and its weight so distributed as to make the action easy for the operator. Moreover, in a single movement, not only are the parts brought forward, where collation may be conveniently effected, but they are automatically thrown to such an angle and position as to permit of easy sheet-assembling.

The printing instrumentalities of the typewriter usually include type-bars (not shown) and a type-guide 75, Figure 1ª, as well as a ribbon-vibrator 76, both of these being so close to the platen 17ª as to interfere with the insertion of work-sheets down around the front of the platen. This difficulty is overcome by floating the platen from full-line printing position at Figure 1ª forwardly over the printing instrumentalities 75, 76, as well as over the inking-ribbon (not shown) to the dotted-line sheet-collating position, the printing line on the platen being always in the line of vision or foremost, as indicated by the arrow at 77.

It will be obvious that, within the scope of the invention, the structure hereinbefore shown and described may be considerably modified, particularly as to the means whereby the floating action of the parts is attained, and as to the positions assumed by the parts for sheet-arranging and typing.

Having thus described my invention, I claim:

1. The combination with a platen which is bodily movable to and from operative position, of a collating board connected at one of its ends to the platen and movable with it to assume substantially vertical and horizontal positions, said collating board being pivotally supported intermediate its ends, and means for actuating the platen when in operative position, said means being disengageable from the platen to permit the latter to be swung forwardly and upwardly to its inoperative position with the collating board face upward.

2. The combination with a rotary platen, of means for operating the same, said platen being bodily movable away from said means, a collating board connected at one of its ends to the platen and movable with it to assume substantially vertical and horizontal positions, said collating board being pivotally supported intermediate its ends, and means for actuating the platen when in operative position, said means being disengageable from the platen to permit the latter to be swung forwardly and upwardly to its inoperative position with the collating board face upward.

3. The combination with a rotary platen, of a collating board affixed thereto, the platen and board being bodily movable in unison, said collating board being pivotally supported intermediate its ends, and means for actuating the platen when in operative position, said means being disengageable from the platen to permit the latter to be swung forwardly and upwardly to its inoperative position with the collating board face upward.

4. The combination with a rotary platen, of a collating board affixed thereto, said platen and board being bodily movable about a common pivot to assume substantially horizontal and vertical positions, and means for actuating the platen when in operative position, said means being disengageable from the platen to permit the latter to be swung forwardly and upwardly to its inoperative position with the collating board face upward.

5. The combination with a rotary platen, of a collating board affixed thereto, platen operating means, the platen being bodily movable to and from the operating means, and the collating board being movable to substantially horizontal and vertical positions, said collating board being pivotally supported intermediate its ends, and means for actuating the platen when in operative position, said means being disengageable from the platen to permit the latter to be swung forwardly and upwardly to its inoperative position with the collating board face upward.

6. The combination with a rotary platen which is movable to and away from printing position and has a clutch member thereon, of a stationary clutch member arranged to engage the first clutch member when the platen is in printing position, and a collating board connected at one end of its ends to the platen and movable with it to assume substantially vertical and horizontal positions.

7. The combination with a typewriter frame, of a rotatable platen, operating means for the platen including clutch members associated with the frame, clutch members on the platen arranged to engage the clutch members on the frame, means for supporting the platen whereby it may be swung away from the operating means, and a collating board associated with the platen.

8. The combination with a typewriter frame, of a collating board pivoted thereon, said board having a sheet clamping device slidably mounted thereon and counterweights associated with the clamping device, and a platen mounted on the board.

9. The combination with a typewriter frame, a collating board pivoted between its ends on said frame, a rotatable platen carried by one end of the board, clutch members on said platen, complemental clutch members on the frame, and means for operating the platen when the clutch members are engaged.

10. The combination with a typewriter frame, of a collating board pivoted between its ends on said frame, means for supporting the board in substantially a horizontal position, a revoluble platen carried by one end of the board, clutch members on said platen, complemental clutch members on the frame, and means for operating the platen when the clutch members are engaged.

11. The combination with a typewriter frame, of a pair of brackets mounted thereon, links pivoted to the brackets, a collating frame pivoted between its ends to the links, a platen carried by one end of the frame, links pivoted to the typewriter frame and to the collating frame in proximity to the platen, and platen operating mechanism on the typewriter frame arranged to receive the platen.

12. The combination with a typewriter frame, of a collating frame pivotally mounted thereon, a platen mounted on a collating frame, a sheet guide extending around the platen, there being an open space between the platen and the guide at the front of the machine, whereby the sheets may be inserted, means on the frame for moving the guide toward the platen to guide the work-sheet in position, and means on the frame for moving the guide from the platen.

13. The combination with a typewriter frame, of a pair of brackets mounted thereon, a collating frame, links pivoted to the brackets and to the latter frame between the ends thereof, and links pivoted to the former frame and to the collating frame adjacent to the end thereof.

14. The combination with a typewriter frame, of a collating board pivoted thereon, said board having a sheet clamping device slidably mounted thereon, counterweights associated with said device, a platen mounted on the board, and a sheet guiding device mounted on the collating board frame, whereby the work-sheets may be inserted from the front down over the printing position on the typewriter and guided around the platen to the rear of the same.

15. The combination with a typewriter frame, of a pair of brackets and a pair of lugs mounted thereon, links pivoted to the lugs, links pivoted to the brackets, a collating frame pivoted between its ends to the free ends of the links, a platen carried by one end of the collating frame, and a platen operating mechanism on the typewriter arranged to receive the platen.

16. The combination with a rotary platen having a clutch member thereon, of a collating board including a frame for supporting the platen, the board being pivotally mounted whereby it may move to substantially vertical and horizontal positions, a clutch member adapted to engage the clutch member on the platen when the collating board is in a vertical position, and means on the collating board frame for locking the clutch members together.

17. The combination with a typewriter including a platen and a collating board, of a guiding member extending around the platen, said collating board being adapted to swing into vertical and horizontal positions, and means for raising one end of the guide higher than the printing position on the platen when the collating board is in its horizontal position, whereby the sheets may be inserted from the front of the machine down over the printing position on the platen.

18. In a typewriter including a rotary platen and a collating board adapted to swing into vertical and horizontal positions, a sheet guiding device extending around the platen, and means for swinging the guiding device toward the platen when the collating board moves to its vertical position and away from the platen when the collating board moves to its horizontal position.

19. The combination of a typewriter frame of a collating board thereon movable from a substantially horizontal collating position to an inclined printing position, and guiding means for the board arranged to compel first a substantially horizontal backward movement then a turning movement to an inclined position, then a substantially vertical endwise movement to bring the lower front end of the board to front feeding printing position as the board is moved from collating to printing position.

20. In a front-strike typewriting machine, a rotary platen, a carriage therefor, a collating table, a frame on which the platen and collating table are carried, and means pivoted on separate axes on said frame and also pivoted on separate axes on the carriage, whereby said frame with the platen and collating table may be floated between typing position and a sheet-arranging position.

21. The combination of a typewriter frame, a collating board thereon movable from a substantially horizontal collating position to an inclined printing position, guiding links pivoted on the typewriter frame and the board to compel first a substantial horizontal backward movement of the board, then a turning movement to an inclined position, then a substantial vertical movement to bring the lower front end of the board to front feeding printing position as the board is moved from collating position to printing position.

22. In a front-strike typewriting machine, a rotary platen, a carriage therefor, a platen-bearing or mount which is shiftable on the carriage between typing position and a sheet-arranging position, a link or swinging device pivoted at one point to the carriage and pivotally connected at another point to the platen-bearing so as to act as a carrier on which to float the platen forwardly from the typing to the sheet-arranging position, and another link or swinging device having separate pivotal connections to the carriage and to the platen-bearing, at points diverse from the connections of the first-mentioned link device, for automatically effecting such floating of the platen on the first-mentioned carrier link device during the swing of the latter, as to cause the platen to present its printing line to the line of vision when the platen reaches its forward or sheet-arranging position.

23. In a front-strike typewriting machine, a collating board, a rotary platen, a carriage therefor, a platen-bearing which is shiftable on the carriage forwardly away from typing position to a sheet-arranging position, links pivoted to the carriage and pivotally connected to the platen-bearing so as to act as arms and carriers on which to float the platen-bearing from back to front of the point of connection of said links to the carriage, between the typing and the sheet-arranging position, and means for automatically effecting such angular movement of the platen on the carrying links during the swing of the latter as to cause the platen to present its printing line to the line of vision when the platen reaches the forward or sheet-arranging position.

24. In a front-strike typewriting machine, having a platen-frame, a collating table on the platen-frame, a carriage for the platen-frame, and means for guiding the platen, with the platen-frame and collating table, first upwardly then forwardly from typing position to a collating position, while at the same time keeping the printing line of the platen in the field of vision until the platen comes to rest in its forward or collating position.

25. In a front-strike typewriting machine, a rotary platen, a carriage therefor, a platen-frame shiftable on the carriage between typing position and a collating position, a collating table on the platen-frame, links or swinging device pivoted at opposite points to the carriage, and pivotally connected to the lower part of the united platen-frame and collating table, so as to act as arms and carriers on which to float the platen and collating table between typing and collating positions, and links or swinging device having at other points pivotal connections to the carriage removed from the points of connection of the first-mentioned swinging device to the carriage, and having at other points thereof pivotal connections to a higher part of the united platen-frame and collating table, for automatically effecting such angular movement of the platen-frame on the carrying links or swinging device during the swing of the latter as to cause the table to be tilted and the platen to present its printing line to the line of vision when the parts come to rest in collating position.

26. In a typewriting machine, a rotary platen, a frame for the platen, a collating board upright when in typing position on said frame, and means for guiding the platen and the foot of the board upwardly and then forwardly from printing position to a sheet-collating position, and for simultaneously guiding the upper part of the board downwardly to present the front face thereof for collating purposes.

27. The combination with a typewriter frame, of a collating board thereon, said board having a pivoted sheet-clamping device slidable thereon, and counterweights associated with said clamping device.

28. The combination with a rotary platen, of feed-rollers therefor, a collating board, and means for guiding both of said elements together with the board face up from typing position upwardly, then the platen forwardly, and the top of the board rearwardly and forwardly between typing position and a collating position.

29. The combination with a rotary platen, of a paper guide carrying feed-rollers, a collating board, means whereby all of said elements may be shifted together with the board face up between typing position and a collating position, and means for releasing said guide and feed-rollers in either position.

30. The combination in a front strike typewriter of a platen, a collating board, a frame therefor, a sheet-apron or guide mounted on said frame and extending around the platen beneath the same, and means for moving the platen and sheet-apron together upwardly and forwardly from typing position to sheet-arranging position with the printing line on the platen continuously in the field of vision.

31. The combination with a platen, a collating board, of a frame therefor, a sheet-apron or guide mounted on said frame to extend around the under side of the platen, means for moving the platen and sheet-apron together away from typing position forwardly to sheet-arranging position, feed-rollers carried by the apron, and means for releasing the feed-rollers from the platen and applying the same to the platen in sheet-arranging position.

32. The combination with a rotary platen, of a frame therefor, a collating table and a paper-apron or guide both carried by said frame, said guide extending around the platen beneath the same, and means for shifting the frame with the platen, collating table and paper-apron thereon between typing and collating positions with the table face up, so that in collating position the front end of the paper-apron is adjacent the foot of the collating table to receive and guide the sheets collated on the latter down around the front of the platen.

33. The combination with a rotary platen, of a frame therefor, a collating table and a paper-apron or guide carried by said frame and extending around the platen beneath the same, means for shifting the frame with the platen, collating table and paper-apron thereon forwardly from typing and collating positions with the collating table face up, so that in collating position the front end of the paper-guide is adjacent the foot of the collating table to receive and guide downwardly sheets collated on the latter to and around the platen, and means carried by said frame to operate the apron to clamp the sheets to the platen between the latter and the paper-apron.

34. The combination with a rotary platen, of a carriage therefor, a collating board, supporting attachments for the board to the carriage located in part forward and in part rearward of the carriage to distribute the weight of the board fore and aft on the carriage, and means whereby the board may be swung on said attachments between a collating position and a typing position.

35. The combination with a rotary platen, of a carriage therefor, a collating board, supporting attachments for the board to the carriage located in part forward and in part rearward of the carriage to distribute the weight of the board fore and aft on the carriage, and linkages from the board to the supporting attachments to permit the board to be swung on said attachments between a collating position and a typing position.

36. The combination with a typewriter, of a collating table, an arm pivoted at one end to the typewriter rearward of the collating table and at its other end to the collating table, and another arm pivoted at one end to the typewriter normally forward of the collating table and at its other end to the lower part of the collating table, whereby the table may be swung between normal and collating positions.

37. In a front-strike typewriting machine, a collating board, carrying a rotary platen translatable bodily forwardly and backwardly between a printing station and a sheet-inserting station; an apron or paper-guide which extends around the lower part of the platen, to form with the platen, at the front of the latter, a mouth for the introduction of sheets; a releasable clamp or means for holding the sheets to the platen; and means for floating or translating the platen bodily, printing face foremost, together with the apron and clamp, upwardly and forwardly, to the sheet-inserting station, whereby at the sheet-inserting station the apron may serve as a guide to the platen for sheets inserted bottom-end first into said mouth, and the clamp may be applied to hold the sheets so inserted, preparatory to returning the platen to the printing station.

38. In a front-strike typewriting machine, a rotary platen provided with paper-guiding means and translatable bodily between a printing station and a sheet-inserting station; mechanism at the printing station for printing against the front face of the platen; a carriage; a frame on the carriage for the platen; and a set of linkage connections from the carriage to the frame, each connection pivoted to the carriage and also to the frame separately from the other connection, for floating or translating the frame and platen on the carriage upwardly, the platen forwardly and the frame horizontally, to the sheet-inserting station.

39. In a front-strike typewriting machine, a collating table and a rotary platen movable bodily between a printing station and a collating station; an apron or paper-guide which in the printing station extends around the lower part of the platen to form with the platen, at the front of the latter, a mouth for the passage of sheets; and means for floating the platen printing face continuously in the field of vision together with the apron and collating table upwardly and forwardly, to the collating station, whereby at the collating station the apron may serve as a guide to the platen for sheets inserted bottom-end first into said mouth.

40. In a front-strike typewriting machine a collating board carrying a revoluble platen provided with a paper-guiding apron curving around the bottom of the platen and up in front thereof, means for supporting said platen for a displacing movement thereof away from printing position to sheet-collating position, and means for effecting separation between the displaced platen and the paper-apron and for clamping the same together, so as to permit introduction of the sheets at the front of the platen.

41. In a front-strike typewriting machine, the combination with a revoluble platen and a collating board, of a paper-guiding apron curving around the under side of the platen and up in front thereof, a linkage for floating the platen away from printing position forwardly to sheet-collating position, and means for effecting separation between the platen and the sheet-guiding apron, to permit introduction of sheets when the platen is in collating position.

JOHN ASHLAND WHERRY.

Witnesses:

St. Clair Adams,

J. N. Swing.